United States Patent Office 3,347,847
Patented Oct. 17, 1967

3,347,847
PROCESS FOR THE PURIFICATION OF WATER-SOLUBLE HYDROXYETHYL CELLULOSE
Konrad Engelskirchen, Lank, and Joachim Galinke, Dusseldorf-Holthausen, Germany, assignors to Henkel & Cie, G.m.b.H., Dusseldorf-Holthausen, Germany, a corporation of Germany
No Drawing. Filed Apr. 28, 1965, Ser. No. 451,612
Claims priority, application Germany, May 2, 1964, H 52,574
5 Claims. (Cl. 260—232)

ABSTRACT OF THE DISCLOSURE

A process for the preparation of purified hydroxyethyl celluloses having a low sulfate ash content.

PRIOR ART

Water-soluble hydroxyethyl cellulose is well known. Usually it is prepared by the action of ethylene oxide on cellulose in the presence of alkali, in particular of caustic soda. The reaction itself proceeds as a rule quite smoothly. Difficulties are encountered only during the purification of the water-soluble cellulose ethers, as the etherification is conducted in the presence of large amounts of alkali. The removal of the alkali or of the readily water-soluble salts, formed by the neutralization of the alkali, presents considerable difficulties. A number of publications has dealt with the elimination of these difficulties, but so far without having succeeded to solve this problem in a substantially satisfactory manner.

It is known, to prepare hydroxyethyl cellulose in the presence of solvent mixtures consisting of hydrocarbons, alkylethers, aliphatic ketones and aliphatic alkoxy alcohols, and to extract the cellulose with solvent mixtures of methanol and acetone, neutralizing, if necessary, the residual alkali in the hydroxyethyl cellulose.

Another similar process is known, where for the preparation of the hydroxyethyl cellulose a mixture of monovalent alcohols with 4 to 10 carbon atoms and aliphatic alkoxy alcohols is used as the reaction medium. In this process too, the precipitated hydroxyethyl cellulose is extracted with a mixture of methanol and acetone and the residual alkali is neutralized, if necessary.

Furthermore, the purification of hydroxyethyl cellulose has been carried out in such a way that the caustic soda is neutralized with acids such as propionic acid, benzoic acid or nitric acid or with mixtures of these acids, and thereafter the water-soluble salts are extracted with solvents containing specific, small amounts of water. Here it is important, to select very specific water contents so that on one hand a swelling of the hydroxyethyl cellulose may be prevented, while on the other hand the sodium salts can be washed out with sufficient speed.

All these purification processes mentioned in the preceding have the great disadvantage, that considerably large amounts of solvents are required to obtain products with low ash contents.

Lastly, a process for the preparation of pure hydroxyethyl cellulose has been discovered whereby first of all, using the customary amounts of sodium hydroxide, a low molecular-substituted hydroxyethyl cellulose is prepared which can be easily purified by washing with about 50% aqueous methanol. The precipitated and purified product is then additionally hydroxyethylated in a second process step using catalytic amounts of sodium hydroxide. However, in this process the salt precipitating from the neutralization remains in the water-soluble hydroxyethyl cellulose. The process lastly mentioned also involves technically a considerable expenditure.

It is further known that cellulose may be reacted with glyoxal thus obtaining mono- and di-acetals. By means of this process a junction of the cellulose chains is effected (see "The Journal of the Textile Institute," vol. 49 (1958), page T345–T356). Moreover, it is also known to treat water-soluble cellulose derivatives with glyoxal. This glyoxal treatment has the effect that the pre-treated products may be readily stirred lumpfree and dissolved in water.

OBJECTS OF THE INVENTION

It is therefore an object of this invention to provide a simple and economic process for purifying hydroxyethyl cellulose.

A further object is to provide a process for obtaining a pure hydroxyethyl cellulose product having a sulfate ash content of less than 2 percent.

These and other objects of the invention will become apparent as the description thereof proceeds.

THE INVENTION

A process has now been discovered to purify hydroxyethyl cellulose by washing out the water-soluble impurities, this process being characterized in that the hydroxyethyl cellulose to be purified is treated with glyoxal at an acid pH-value, then is washed at a pH-value of about 2 to 6, in particular 3 to 5, once or several times with water having a temperature of 0 to 30, in particular 0 to 20° C., and is finally dried.

The hydroxyethyl cellulose to be purified is prepared according to well known methods. For example, cellulose preferably in finely distributed form is dispersed in an organic solvent which is inert under the prevailing reaction conditions compared with ethylene oxide and which is at least partially water-miscible. Then the cellulose is admixed with aqueous alkali and after a period of time ethylene oxide is added to the mixture. If necessary, the reaction may be conducted at elevated temperature under pressure.

As dispersing agents for the cellulose the following are suitable: secondary and tertiary aliphatic alcohols, such as isopropanol, isobutanol, tertiary butanol; also ketones, for example acetone, methylethyl ketone and others. The use of dioxane or alkoxy ethers is also possible in principle. The solvents are used either individually or as mixtures, that is, as a rule in such amounts that well stirable or well pumpable mixtures are obtained.

The process of this invention for the purification of hydroxyethyl cellulose relates also to those products, which in addition to hydroxyethyl groups contain other substituents, such as for example, hydroxypropyl-, hydroxybutyl-, methyl-, ethyl-, and propyl-radicals. The process according to the invention may also be employed to advantage when the characteristics of the hydroxyethyl cellulose decisive for the present purification process are retained, that is when the product is readily soluble in cold as well as in hot water. In the case, for example, as with methyl cellulose, insolubility in hot water should occur, it would of course be simpler to wash this cellulose derivative with hot water to become salt-free.

To accomplish the process of the invention, the hydroxyethyl cellulose is treated first with glyoxal in the presence of acid at elevated temperature. For this purpose, the suspension precipitated from the hydroxyalkylation may be acidified with any suitable acid and then admixed with glyoxal. Thus, a very uniform distribution of the glyoxal on the hydroxyethyl cellulose is attained and with it a uniform cross-linking during the subsequent heating.

Furthermore, it is possible first to isolate the hydroxyethyl cellulose from the reaction mixture and then, if necessary, to admix the hydroxyethyl cellulose with glyoxal after being pre-dried. The acidification of the hydroxyethyl cellulose may take place in the reaction mixture or after its isolation prior to the addition of glyoxal.

Following the acidification, the hydroxyethyl cellulose is treated with about 0.25 to 2%, in particular 0.5 to 1.5% glyoxal. For the treatment, the hydroxyethyl cellulose may be present as a suspension in an organic solvent. In this case, the glyoxal may be used in any form chosen, for example, as an aqueous solution or as a solution in an organic solvent. The treatment is conducted at temperatures of about 40 to 90° C., preferably 50 to 70° C. The time required amounts to from about fifteen minutes to several hours. Thereafter, the treated hydroxyethyl cellulose is isolated by means of filtration or centrifuging and then dried.

The drying may be carried out in any manner chosen, for example, in the drying chamber, on rollers or on heated bands at temperatures of from 30 to 180° C., preferably 70 to 150° C. During the drying a second reaction of the hydroxyethyl cellulose with the glyoxal occurs.

In case the acidified hydroxyethyl cellulose is present in surface-dried, solid form, the treatment with the glyoxal is conducted advantageously in such a way that the latter is, if necessary, steamed or sprayed on in the form of a solution. In this case the reaction is again effected at temperatures of from 30 to 180° C., preferably 70 to 150° C., during a reaction period of about 5 minutes to 24 hours.

Of importance for this method is the addition of a sufficient amount of acid. As a rule, an acid excess of at least 1 to 5% of the amount necessary for the neutralization of the alkali is chosen. However, slightly larger amounts of acid used here would not be detrimental in this process.

Following the glyoxal treatment, the purification of the pre-treated hydroxyethyl cellulose is achieved by washing out the salts contained in the hydroxyethyl cellulose. This is done with about 2 to 50 times, in particular, with 5 to 30 times the amount of water. The wash water is advantageously not used all at one time, but in portions. Of course, the washing may also be carried out continuously.

The temperature of the wash water shall be between 0 to 30°, in particular, between 0 to 20° C. It should have a pH-value of about 2 to 6, in particular, 3 to 5. As the treatment with glyoxal is usually conducted at a strongly acid pH-value, in most cases the remaining acid amount suffices to give the wash water without further acid addition a pH-value of about 3 to 5.

For the complete washing out of the dissolved salts, in general a treatment lasting about 2 to 10 minutes will suffice. In the case that a sufficiently strong cross-linking has been effected by the glyoxal, the wash periods may be prolonged, for example up to about one-half hour.

Subsequent to the washing out of the salts, the hydroxyethyl cellulose is isolated by filtration or by centrifuging. Thereafter, the salts are dried with any known drying apparatus, for example, on a roller or on a heated band. For various intended uses it is advisable to grind the raw product again.

The hydroxyethyl cellulose purified according to the process of the invention is precipitated as a white or at best as a slightly yellowish product. The ash contents are minimal compared with the commercial products. They are (calculated as sulfate ash) less than 2%, frequently even less than 1.5%. The purified hydroxyethyl cellulose reacts generally only in a weakly acid manner and requires in water periods for dissolving of somewhat longer duration than those hydroxyethyl celluloses which had been purified by a different method.

Furthermore it has been found that by naturalization of the rather small portions of acid still remaining in the hydroxyethyl cellulose, products may be obtained which possess the same characteristics for dissolving as the hydroxyethyl cellulose purified according to a different process. Thus for example, the purified hydroxyethyl cellulose may be, after the water treatment, again suspended in an organic solvent and the suspension may be treated with small amounts of a compound having an alkaline reaction for example caustic alkalis, soda or ammonia. It is also possible, to treat the dried, purified hydroxyethyl cellulose with a gaseous amine or ammonia.

In conclusion, to hasten the dissolving of the purified hydroxyethyl cellulose, following the process described in copending, commonly assigned United States patent application Ser. No. 345,576, filed Feb. 18, 1964, now U.S. Patent No. 3,297,583, the pH-value of the dissolving medium may be shifted to a slightly alkaline range after the introduction of the hydroxyethyl cellulose. Thus, a very rapid and lump-free dissolving of the hydroxyethyl cellulose is effected. As the hydroxyethyl cellulose contains only traces of acid, only very insignificant amounts of salt are formed and introduced into the solution by means of this type of treatment.

The following specific examples are presented to illustrate the invention and to enable persons skilled in the art to better understand and practice the invention and are not intended to be limiative.

Example I

A vigorously stirred suspension of 160 g. of air-dried (moisture content 6.1%), finely divided cellulose in 1 liter of 91% aqueous isopropanol was admixed within the period of one-half hour with 200 g. of 15% aqueous sodium hydroxide, and stirring was continued for 1 hour at room temperature. Then the mixture was heated to 50° C. and a solution of 150 g. of ethylene oxide in 150 cc. of 91% isopropanol was added dropwise over a period of 1 hour. Next, the reaction mixture was heated for a further three hours.

Thereafter, the mixture was acidified by adding 80 g. of concentrated hydrochloric acid, admixed with 3.75 g. of 30% aqueous glyoxal solution, and the stirring was continued for one-half hour at a temperature of 50° C. Then the hydroxyethyl cellulose was isolated by filtration from the still hot reaction mixture and dried in a vacuum dryer at a temperature of 70° C. The dry raw product was then comminuted and vigorously dispersed in 4 liters of water. After about 5 minutes the hydroxyethyl cellulose was filtered off, dried on a roller dryer and pulverized.

Thus, 230 g. of a colorless powder were obtained, with a sulfate ash content of 2.1%.

The washing was accomplished for a different, otherwise similar mixture with 7 liters of water. Here, a sulfate ash content of 1.1% was found.

The product could be stirred lump-free in water and was completely dissolved after one hour. The pH-value of the 2% aqueous solution was 4.1.

Example II 264 g. of raw hydroxyethyl cellulose (ash content=14.2%, 2.4 mol of ethylene oxide per glucose unit), which had been prepared as in Example I from 160 g. of air-dried cellulose powder and isolated as a dry product, were stirred into 1 liter of 90% isopropanol. The suspension precipitating thereby was adjusted with concentrated hydrochloric acid to a pH-value of about 3, then the suspension was admixed with 3.75 g. of aqueous 30% glyoxal solution and heated with stirring for 30 minutes to 50° C. Next, the mixture was filtered and the filtrate was dried for 3 hours at a temperature of 70° C. in a vacuum dryer.

Following this pre-treatment the product was vigorously stirred for 5 minutes in 2 liters of ice water, filtered, again stirred in 2 liters of ice water, again filtered and finally dried on a roller dryer. By grinding the product, a white powder was obtained having an ash content of 1.4%. This powder could be stirred lump-free in water and it was completely dissolved within 55 minutes. The pH-value of a 2% aqueous solution was 4.4. When the pH-value of the solution was adjusted to 7.5, a clear solution was obtained already after 5 minutes.

*Example III*

50 g. of raw water-soluble hydroxyethyl cellulose, prepared according to Example II, were dispersed in 250 cc. of 90% isopropanol. This dispersion was adjusted with hydrochloric acid to a pH-value of 5.1, admixed with increasing amounts of a 30% acid-stabilized aqueous glyoxal solution and stirred for one-half hour at a temperature of 50° C. Then the hydroxyethyl cellulose was filtered off and the filtrate was dried in a vacuum dryer for a period of 3 hours at 70° C.

Half of the dried product was dispersed in 10 times the amount of ice water and the periods were determined, after which the aqueous suspensions were no longer filterable. A 2% aqueous solution was prepared from the remaining amount of product and the periods were determined when the hydroxyethyl cellulose was completely dissolved.

The results have been compiled in the following table and present a basis for the time required for the washing out process depending on the amount of glyoxal used. It is evident, that already with 0.25% of glyoxal a washing in water is feasible, and that from 0.5% useful time periods may be arrived at. Furthermore, it is evident, that up to about 1.5% favorable conditions exist, that is that the solubility is not delayed too long either. From 2% glyoxal on the later dissolving of the hydroxyethyl cellulose requires too long a period.

| Glyoxal addition in g. of 30% per weight, aqueous solution | Percent glyoxal * | No longer filterable after minutes | Dissolved completely after minutes |
| --- | --- | --- | --- |
| 0.083 | 0.05 | 0.5 | 6 |
| 0.415 | 0.25 | 8 | 18 |
| 0.83 | 0.50 | 21 | 50 |
| 1.66 | 1.00 | 26 | 75 |
| 2.49 | 1.50 | 45 | 85 |
| 3.32 | 2.00 | 55 | 100 |

*Based on the hydroxyethyl cellulose used.

*Example IV*

50 g. of the hydroxyethyl cellulose, prepared and purified according to Example I, were dispersed in 250 cc. of 90% isopropanol and after adding a phenolphthalein solution, admixed with a few drops of 0.5 N of sodium hydroxide until the mixture showed a constant red color. Then the mixture was stirred for one-half hour at room temperature, the hydroxyethyl cellulose was filtered off and dried at 70° C.

The dried product dissolved completely after about 15 minutes in water with stirring.

When the suspension was again neutralized with diluted hydrochloric acid prior to the filtering of the hydroxyethyl cellulose and then dried, a product was obtained which also could be dissolved completely in water within 15 minutes. The pH-value of this 2% solution was 6.6.

While certain specific examples and preferred modes of practice of the invention have been set forth it will be understood that this is solely for the purpose of illustration and that various changes and modifications may be made without departing from the spirit of the disclosure and the scope of the appended claims.

We claim:
1. A process for the purification of a hydroxyethyl cellulose which comprises reacting an acidified hydroxyethyl cellulose which may contain a substituent selected from the group consisting of hydroxy lower alkyl and lower alkyl having a sulfate ash content in excess of 2% with 0.25 to 2% by weight of glyoxal at an acid pH and at a temperature between 40 and 90° C., separating and drying the reaction product, washing the dried reaction product with water having a pH of 2 to 6 at a temperature of 0 to 30° C. to wash out salts and recovering the purified hydroxyethyl cellulose having a low sulfate ash content.

2. The process of claim 1 wherein the acidified hydroxyethyl cellulose is present in a dried, solid form.

3. The process of claim 1 wherein the seperated water-washed reaction product is treated with a base to neutralize any acid remaining therein.

4. A process for the purification of a hydroxyethyl cellulose which comprises the steps of contacting a dispersion of an impure hydroxyethyl cellulose having a sulfate ash content in excess of 2%, in a liquid dispersing medium selected from the group consisting of secondary and tertiary lower aliphatic alcohols, lower alkyl ketones and dioxane, with from about 0.25% to about 2% of glyoxal, based on the weight of said impure ether, at a pH of between about 2 and 6 at a temperature of between about 40° C. to about 90° C., separating the reaction product, drying the reaction product, washing the dried reaction product with from 2 to 50 parts, based on the weight of the dried reaction product, of water having a pH of from 2 to 6 and at a temperature of from 0° C. to 30° C. and recovering a purified hydroxyethyl cellulose having a sulfate ash content of below 2%.

5. A process for the purification of a hydroxyethyl cellulose which comprises the steps of contacting a dispersion of an impure hydroxyethyl cellulose having a sulfate ash content in excess of 2%, in an aqueous organic dispersing medium, selected from the group consisting of secondary and tertiary lower aliphatic alcohols, lower alkyl ketones and dioxane with from about 0.5% to about 1.5% of glyoxal, based on the weight of said impure hydroxyethyl cellulose, at a pH of between about 3 to 5 and at a temperature of between about 50° C. and 70° C., separating the reaction product, drying the reaction product at a temperature of between 70° C. and 150° C., washing the dried reaction product with from about 5 to about 30 parts, based on the weight of the dried reaction product, of water having a pH of from 3 to 5 at a temperature of from 0° C. to 20° C., separating and drying the washed product, and recovering a dried, purified hydroxyethyl cellulose having a sulfate ash content of below 2%.

References Cited

UNITED STATES PATENTS 3,049,537   8/1962   Klug et al. _____ 260—232

DONALD E. CZAJA, *Primary Examiner.*

R. W. MULCAHY, *Assistant Examiner.*